United States Patent
Bando et al.

(10) Patent No.: US 12,512,506 B2
(45) Date of Patent: Dec. 30, 2025

(54) SOLID-STATE BATTERY

(71) Applicant: Murata Manufacturing Co., Ltd., Nagaokakyo (JP)

(72) Inventors: Kenichi Bando, Nagaokakyo (JP); Makoto Yoshioka, Nagaokakyo (JP); Osamu Chikagawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 975 days.

(21) Appl. No.: 17/405,717

(22) Filed: Aug. 18, 2021

(65) Prior Publication Data

US 2022/0021024 A1 Jan. 20, 2022

Related U.S. Application Data

(63) Continuation of application No. PCT/JP2020/009463, filed on Mar. 5, 2020.

(30) Foreign Application Priority Data

Mar. 26, 2019 (JP) .................. 2019-059015

(51) Int. Cl.
*H01M 10/0562* (2010.01)
*H01M 4/02* (2006.01)
(Continued)

(52) U.S. Cl.
CPC ....... *H01M 10/0562* (2013.01); *H01M 4/139* (2013.01); *H01M 4/485* (2013.01);
(Continued)

(58) Field of Classification Search
CPC ......... H01M 10/0562; H01M 10/0585; H01M 10/058; H01M 4/139; H01M 4/485; H01M 4/80; H01M 4/70
See application file for complete search history.

(56) References Cited

U.S. PATENT DOCUMENTS

| 8,778,542 B2 | 7/2014 | Iwaya et al. |
| 2007/0166604 A1 | 7/2007 | Katagiri et al. |

(Continued)

FOREIGN PATENT DOCUMENTS

| CN | 1971990 A | 5/2007 |
| CN | 102246335 A | 11/2011 |

(Continued)

OTHER PUBLICATIONS

Written Opinion of the International Searching Authority issued for PCT/JP2020/009463, date of mailing May 26, 2020.

(Continued)

*Primary Examiner* — Helen Oi K Conley
*Assistant Examiner* — Amanda Rosenbaum
(74) *Attorney, Agent, or Firm* — ArentFox Schiff LLP

(57) ABSTRACT

A solid-state battery including a solid-state battery laminate having one or more positive electrode layers, one or more negative electrode layers, and a solid electrolyte interposed therebetween. Each of the electrode layers of the one or more positive electrode layers and the one or more negative electrode layers contains an active material, and an outermost electrode layer of the solid-state battery laminate has a different active material amount with respect to a non-outermost electrode layer located on an inner side of the outermost electrode layer.

18 Claims, 8 Drawing Sheets

(51) Int. Cl.
  H01M 4/139 (2010.01)
  H01M 4/485 (2010.01)
  H01M 4/80 (2006.01)
  H01M 10/0525 (2010.01)
  H01M 10/0585 (2010.01)

(52) U.S. Cl.
  CPC ......... H01M 4/80 (2013.01); H01M 10/0525 (2013.01); H01M 10/0585 (2013.01); *H01M 2004/021* (2013.01)

(56) References Cited

U.S. PATENT DOCUMENTS

| | | | |
|---|---|---|---|
| 2010/0075219 A1 | 3/2010 | Iwaya et al. | |
| 2012/0015234 A1* | 1/2012 | Iwaya | H01M 4/62 429/152 |
| 2012/0052382 A1* | 3/2012 | Yoshida | H01M 4/139 429/211 |
| 2013/0017340 A1* | 1/2013 | Brown | H01M 4/131 427/458 |
| 2013/0017435 A1 | 1/2013 | Sato et al. | |
| 2015/0017542 A1* | 1/2015 | Hirai | H01M 4/5825 429/231.95 |
| 2015/0280221 A1* | 10/2015 | Abdelsalam | H01M 4/0404 429/232 |
| 2015/0340731 A1* | 11/2015 | Kim | H01M 4/525 429/246 |
| 2016/0336617 A1* | 11/2016 | Yamazaki | H01M 10/0525 |
| 2019/0036102 A1* | 1/2019 | Pierce | C01B 32/16 |
| 2019/0341621 A1 | 11/2019 | Masuko et al. | |
| 2020/0350524 A1 | 11/2020 | Nakashima et al. | |

FOREIGN PATENT DOCUMENTS

| | | |
|---|---|---|
| CN | 104145364 A | 11/2014 |
| JP | 2009181905 A | 8/2009 |
| JP | 2011198692 A | 10/2011 |
| JP | 2017183052 A | 10/2017 |
| JP | 2018152197 A | 9/2018 |
| WO | 2008099508 A1 | 8/2008 |
| WO | 2011125482 A1 | 10/2011 |
| WO | 2018180599 A1 | 10/2018 |
| WO | 2018181379 A1 | 10/2018 |
| WO | 2019176945 A1 | 9/2019 |

OTHER PUBLICATIONS

International Search Report issued for PCT/JP2020/009463, date of mailing May 26, 2020.

* cited by examiner

SOLID-STATE BATTERY

CROSS REFERENCE TO RELATED APPLICATIONS

The present application is a continuation of International application No. PCT/JP2020/009463, filed Mar. 5, 2020, which claims priority to Japanese Patent Application No. 2019-059015, filed Mar. 26, 2019, the entire contents of each of which are incorporated herein by reference.

FIELD OF THE INVENTION

The present invention relates to a solid-state battery. More specifically, the present invention relates to a laminated solid-state battery formed by laminating layers constituting a battery constituent unit.

BACKGROUND OF THE INVENTION

Conventionally, secondary batteries that can be repeatedly charged and discharged have been used for various purposes. For example, the secondary batteries are used as a power source of an electronic device such as a smartphone and a notebook computer.

In a secondary battery, a liquid electrolyte is generally used as a medium for ion transfer that contributes to charge and discharge. That is, a so-called electrolytic solution is used for the secondary battery. However, in such a secondary battery, safety is generally required in terms of preventing leakage of an electrolytic solution. In addition, since an organic solvent or the like used for the electrolytic solution is a flammable substance, safety is also required in that respect.

Therefore, a solid-state battery using a solid electrolyte instead of an electrolytic solution has been studied.
Patent Document 1: Japanese Patent Application Laid-Open No. 2009-181905
Patent Document 2: Japanese Patent No. 2017-183052
Patent Document 3: Japanese Patent Application Laid-Open No. 2011-198692
Patent Document 4: International Publication WO 2008/099508

SUMMARY OF THE INVENTION

A solid-state battery generally includes a solid-state battery laminate including a positive electrode layer, a negative electrode layer, and a solid electrolyte therebetween (see Patent Documents 1 to 4 described above). In the solid-state battery laminate, for example, as disclosed in Patent Documents 1 to 3, the electrodes of the positive electrode layer and the negative electrode layer often include a current collecting layer and a current collector (hereinafter, also simply referred to as a "current collecting layer"). On the other hand, in such a solid-state battery laminate, a "current collection less" solid-state battery without a current collecting layer is also considered (Patent Document 4 described above).

The inventors of the present application have noticed that there is a problem to be overcome in a current collection-less solid-state battery and have found a need to take measures therefor. Specifically, the inventors of the present application have found that there are the following problems.

In a solid-state battery including a current collecting layer on electrodes of a positive electrode layer and a negative electrode layer, the current collecting layer has a property of passing electricity because it is an electric conductor, but has a property of not passing ions. Therefore, when the current collecting layer is eliminated, ionic insulation is not performed, and the balance of the charge-discharge reaction in the solid-state battery may be lost. In the charge-discharge reaction of the solid-state battery, lithium ions move back and forth between the positive electrode and the negative electrode via the solid electrolyte, but the present inventors have found that the current collection-less solid-state battery may not be suitable in terms of such a charge-discharge reaction.

The present invention has been made in view of such problems. That is, a main object of the present invention is to provide a current collection-less solid-state battery which is more suitable in terms of a charge-discharge reaction.

The inventors of the present application have tried to solve the above problems by addressing in a new direction instead of addressing in an extension of the prior art. As a result, the present inventors have reached the invention of a solid-state battery in which the above main object has been achieved.

According to the present invention, there is provided a solid-state battery including a solid-state battery laminate having one or more positive electrode layers, one or more negative electrode layers, and a solid electrolyte interposed between the one or more positive electrode layers and the one or more negative electrode layers. Each of electrode layers of the one or more positive electrode layers and the one or more negative electrode layers contains an active material, and an outermost electrode layer of the solid-state battery laminate among the electrode layers has a different active material amount with respect to a non-outermost electrode layer located on an inner side of the outermost electrode layer.

The solid-state battery according to the present invention is a current collection-less solid-state battery more suitable in terms of a charge-discharge reaction.

More specifically, in the solid-state battery of the present invention, the balance of the depth of charge and discharge is improved between the outermost electrode layer and the non-outermost electrode layer. As a result, a prescribed voltage can be easily obtained at the time of discharge, and discharge can be performed at a target energy density.

DETAILED DESCRIPTION OF THE INVENTION

Figure 1:
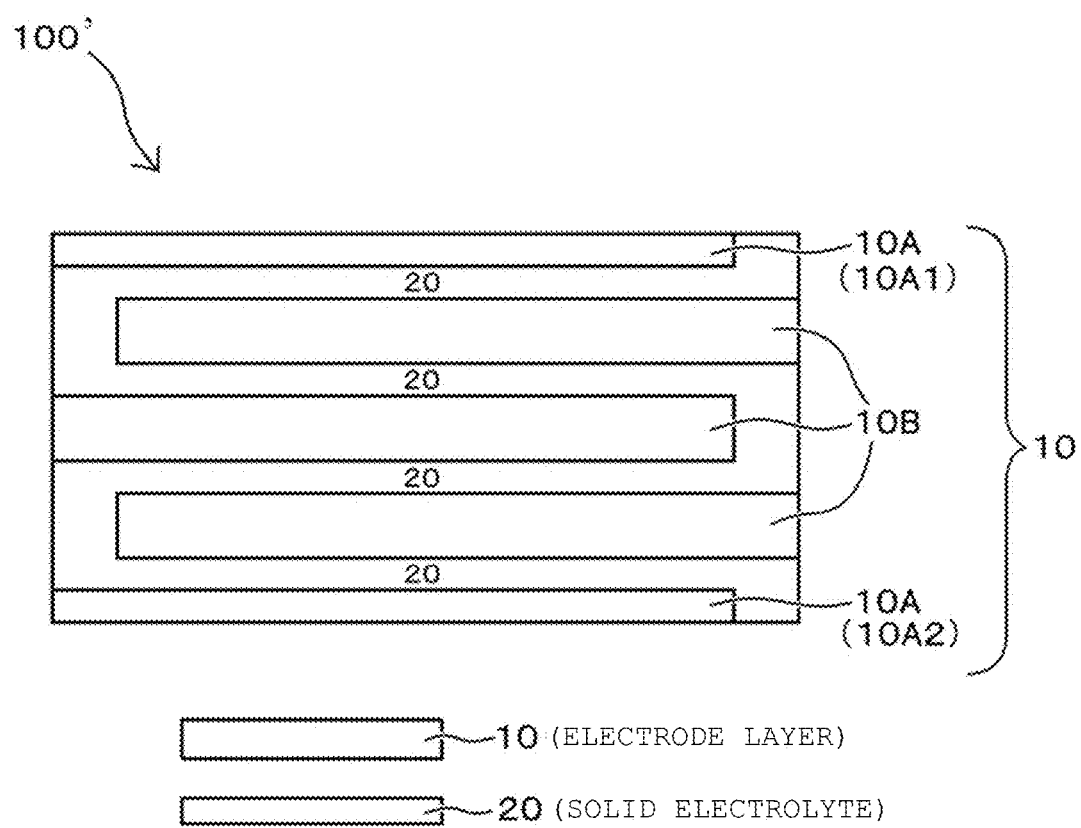
FIG. 1 is a sectional view schematically showing a solid-state battery (particularly, a solid-state battery laminate) according to an embodiment of the present invention.

Hereinafter, the solid-state battery of the present invention will be described in detail. Although the description will be made with reference to the drawings as necessary, the illustrated contents are only schematically and exemplarily illustrated for the understanding of the present invention, and the appearance, the dimensional ratio, and the like may be different from the actual ones.

The solid-state battery referred to in the present invention, in a broad sense, refers to a battery whose constituent elements are composed of a solid, and in a narrow sense, refers to an all-solid-state battery whose battery constituent elements (particularly preferably all battery constituent elements) are composed of a solid. In a preferred aspect, the solid-state battery in the present invention is a laminated solid-state battery configured such that layers constituting a battery constituent unit are laminated with each other, and preferably each of such layers is composed of a sintered body. The solid-state battery includes not only a so-called secondary battery capable of repeating charging and discharging but also a primary battery capable of only discharging. According to a preferred aspect of the present invention, the solid-state battery is a secondary battery. The secondary battery is not excessively limited by its name, and may include, for example, a power storage device and the like.

The term "plan view" as used herein is based on a form in the case where an object is viewed from the upper side or the lower side along the thickness direction based on a lamination direction of the layers constituting the solid-state battery. In addition, the term "sectional view" as used herein is based on a form when viewed from a direction substantially perpendicular to the thickness direction based on the lamination direction of the layers constituting the solid-state battery (in short, a form in the case of being cut along a plane parallel to the thickness direction). The terms "longitudinal direction" and "lateral direction" used directly or indirectly herein respectively correspond to the up-down direction and the left-right direction in the drawing. Unless otherwise specified, the same reference numerals or symbols indicate the same members/portions or the same semantic contents. In a preferred aspect, it can be understood that the downward direction in the vertical direction (that is, the direction in which gravity acts) corresponds to the "downward direction", and the opposite direction corresponds to the "upward direction".

The various numerical ranges referred to herein are intended to include the lower and upper limit values themselves, unless otherwise stated. That is, when a numerical range such as 1 to 10 is taken as an example, unless otherwise specified, it can be construed as including not only the lower limit value of "1" but also the upper limit value of "10".

[Basic Configuration of Solid-State Battery]

The solid-state battery includes at least electrode layers of a positive electrode and a negative electrode and a solid electrolyte. Specifically, the solid-state battery includes a solid-state battery laminate having a battery constituent unit including one or more positive electrode layers, one or more negative electrode layers, and a solid electrolyte interposed therebetween.

In the solid-state battery, each layer constituting the solid-state battery is formed by firing, and a positive electrode layer, a negative electrode layer, a solid electrolyte, and the like form a sintered layer. Preferably, the positive electrode layer, the negative electrode layer, and the solid electrolyte are fired integrally with each other, and therefore the solid-state battery laminate forms an integrally sintered body.

The positive electrode layer is an electrode layer containing at least a positive electrode active material. The positive electrode layer may further contain a solid electrolyte. For example, the positive electrode layer is composed of a sintered body containing at least positive electrode active material particles and solid electrolyte particles. In a preferred aspect, the positive electrode layer is composed of a sintered body substantially containing only positive electrode active material particles and solid electrolyte particles. On the other hand, the negative electrode layer is an electrode layer containing at least a negative electrode active material. The negative electrode layer may further contain a solid electrolyte. For example, the negative electrode layer is composed of a sintered body containing at least negative electrode active material particles and solid electrolyte particles. In a preferred aspect, the negative electrode layer is composed of a sintered body substantially containing only negative electrode active material particles and solid electrolyte particles.

The positive electrode active material and the negative electrode active material are substances involved in the transfer of electrons in the solid-state battery. Ions move (conduct) between the positive electrode layer and the negative electrode layer via the solid electrolyte, and electrons are transferred, whereby charging and discharging are performed. The positive electrode layer and the negative electrode layer are preferably layers capable of occluding and releasing particularly lithium ions or sodium ions. That is, the solid-state battery is preferably an all-solid-state secondary battery in which lithium ions or sodium ions move between the positive electrode layer and the negative electrode layer via the solid electrolyte to charge and discharge the battery.

(Positive Electrode Active Material)

Examples of the positive electrode active material contained in the positive electrode layer include at least one selected from the group consisting of a lithium-containing phosphate compound having a NASICON-type structure, a lithium-containing phosphate compound having an olivine-type structure, a lithium-containing layered oxide, a lithium-containing oxide having a spinel-type structure, and the like. An example of such a lithium-containing phosphate compound having a NASICON-type structure includes $Li_3V_2(PO_4)_3$. An example of such a lithium-containing phosphate compound having an olivine-type structure includes $LiFePO_4$ and/or $LiMnPO_4$. An example of such a lithium-containing layered oxide includes $LiCoO_2$ and/or $LiCo_{1/3}Ni_{1/3}Mn_{1/3}O_2$. Examples of the lithium-containing oxide having a spinel-type structure includes $LiMn_2O_4$ and/or $LiNi_{0.5}Mn_{1.5}O_4$.

Examples of the positive electrode active material capable of occluding and releasing sodium ions include at least one selected from the group consisting of a sodium-containing phosphate compound having a NASICON-type structure, a sodium-containing phosphate compound having an olivine-type structure, a sodium-containing layered oxide, a sodium-containing oxide having a spinel-type structure, and the like.
(Negative Electrode Active Material)

Examples of the negative electrode active material contained in the negative electrode layer include at least one selected from the group consisting of an oxide containing at least one element selected from the group consisting of Ti, Si, Sn, Cr, Fe, Nb, and Mo, a graphite-lithium compound, a lithium alloy, a lithium-containing phosphate compound having a NASICON-type structure, a lithium-containing phosphate compound having an olivine-type structure, a lithium-containing oxide having a spinel-type structure, and the like. An example of such a lithium alloy includes Li—Al. An example of such a lithium-containing phosphate compound having a NASICON-type structure includes $Li_3V_2(PO_4)_3$ and/or $LiTi_2(PO_4)_3$. An example of such a lithium-containing phosphate compound having an olivine-type structure includes $LiCuPO_4$. An example of such a lithium-containing oxide having a spinel-type structure includes $Li_4Ti_5O_{12}$.

Examples of the negative electrode active material capable of occluding and releasing sodium ions include at least one selected from the group consisting of a sodium-containing phosphate compound having a NASICON-type structure, a sodium-containing phosphate compound having an olivine-type structure, a sodium-containing oxide having a spinel-type structure, and the like.

The positive electrode layer and/or the negative electrode layer may contain a conductive auxiliary agent. Examples of the conductive auxiliary agent contained in the positive electrode layer and the negative electrode layer may include at least one kind of metal materials such as silver, palladium, gold, platinum, aluminum, copper, and nickel, carbon, and the like.

Further, the positive electrode layer and/or the negative electrode layer may contain a sintering aid. Examples of the sintering aid may include at least one selected from the group consisting of lithium oxide, sodium oxide, potassium oxide, boron oxide, silicon oxide, bismuth oxide, and phosphorus oxide.

In the solid-state battery of the present invention according to a preferred aspect, the positive electrode layer and the negative electrode layer are made of the same material. While the solid-state battery of the present invention does not include a current collector/current collecting layer, which is "current collection less", as described later, the positive electrode layer and the negative electrode layer in such a current collection-less state may be made of the same material (e.g., in such a case, the positive electrode active material contained in the positive electrode layer and the negative electrode active material contained in the negative electrode layer may be of the same type).
(Solid Electrolyte)

The solid electrolyte is a material capable of conducting lithium ions or sodium ions. In particular, the solid electrolyte constituting a battery constituent unit in the solid-state battery forms a layer capable of conducting lithium ions between the positive electrode layer and the negative electrode layer. Because of the solid-state battery, the solid electrolyte preferably does not contain gel-like or liquid electrolytes/electrolyte solutions. The solid electrolyte may be provided at least between the positive electrode layer and the negative electrode layer. That is, the solid electrolyte may also exist around the positive electrode layer and/or the negative electrode layer so as to protrude from between the positive electrode layer and the negative electrode layer. Specific examples of the solid electrolyte include a lithium-containing phosphate compound having a NASICON structure, an oxide having a perovskite structure, and an oxide having a garnet-type or garnet-type similar structure. Examples of the lithium-containing phosphate compound having a NASICON structure include $Li_xM_y(PO_4)_3$ ($1 \leq x \leq 2$, $1 \leq y \leq 2$, and M is at least one selected from the group consisting of Ti, Ge, Al, Ga, and Zr). An example of such a lithium-containing phosphate compound having a NASICON-structure includes $Li_{1.2}Al_{0.2}Ti_{1.8}(PO_4)_3$. An example of such an oxide having a perovskite structure includes $La_{0.55}Li_{0.35}TiO_3$. An example of such an oxide having a garnet-type or garnet-type similar structure includes $Li_7La_3Zr_2O_{12}$.

Examples of the solid electrolyte capable of conducting sodium ions include a sodium-containing phosphate compound having a NASICON structure, an oxide having a perovskite structure, and an oxide having a garnet-type or garnet-type similar structure. Examples of the sodium-containing phosphate compound having a NASICON structure include $Na_xM_y(PO_4)_3$ ($1 \leq x \leq 2$, $1 \leq y \leq 2$, and M is at least one selected from the group consisting of Ti, Ge, Al, Ga, and Zr).

The solid electrolyte may contain a sintering aid. The sintering aid contained in the solid electrolyte may be selected from, for example, the same materials as the sintering aid that can be contained in the positive electrode layer and the negative electrode layer.
(Protective Layer)

A protective layer may be generally formed on the outermost side of the solid-state battery, and is for electrical, physical, and/or chemical protection. A material constituting the protective layer is preferably excellent in insulation property, durability and/or moisture resistance, and environmentally safe. For example, glass, ceramics, a thermosetting resin and/or a photocurable resin is/are preferably used.
(Terminal)

The solid-state battery is generally provided with a terminal (e.g., an external terminal). In particular, a terminal is provided on a side surface of the solid-state battery. More specifically, a terminal on the positive electrode side connected to the positive electrode layer and a terminal on the negative electrode side connected to the negative electrode layer are provided. Such a terminal preferably contains a material having high conductivity. A specific material of the end face electrode is not particularly limited and may be at least one selected from the group consisting of silver, gold, platinum, aluminum, copper, tin, and nickel.
[Characteristics of Solid-State Battery of Present Invention]

In the solid-state battery of the present invention, each of the positive electrode layer and the negative electrode layer contains an active material, and the solid-state battery is characterized in terms of the amount of the active material. More specifically, among the plurality of electrode layers, an outermost electrode layer and a non-outermost electrode layer (i.e., an inner layer electrode) located on the inner side of the outermost electrode layer are different from each other in terms of the electrode amount.

In this regard, each of the positive electrode layer and the negative electrode layer is preferably a "current collection less" battery that does not include a current collector or a current collecting layer (may also be simply referred to as a "collection-less solid-state battery", a "collection-less battery" or a "collecting layer-less solid-state battery") and is characterized in terms of the electrode amount of such a collection-less battery. In the solid-state battery of the present invention, because of "current collection less", a current collector/current collecting layer provided so as to be in direct contact with the electrode layer is not provided in the solid-state battery laminate, and a current collector/current collecting layer extending inside the electrode layer is not provided. For example, the solid-state battery laminate does not have a layer mainly composed of a metal body or a metal sintered body, and therefore the solid-state battery laminate does not include such a conductive layer. That is, the battery of the present invention, particularly the solid-state battery laminate has a current collector-less structure or a current collecting layer-less structure. Here, in the "current collection less" solid-state battery according to the present invention, among the plurality of electrode layers, an outermost electrode layer and a non-outermost electrode layer (i.e., an inner layer electrode) located on the inner side of the outermost electrode layer are different from each other in terms of the electrode amount. The current collector/current collecting layer not included in the present invention, which is intended by the expression "current collection less" means a "conductive layer not containing an active material (e.g., a metal foil layer, or a sintered body layer formed of a conductive auxiliary agent and a sintering aid)" provided separately from a "layer containing an active material" from the viewpoint of reducing the internal resistance and the like. Therefore, the solid-state battery of the present invention does not include the "conductive layer not containing an active material" (in particular, a "conductive layer not containing an active material" provided in contact with a "layer containing an active material" or provided inside such a layer containing an active material) provided exclusively for such internal resistance reduction.

In view of the fact that the electrode layer does not include a current collecting layer, which is "current collection less", each of the electrode layers of the positive electrode layer and the negative electrode layer may contain only the active material, or each of the electrode layers of the positive electrode layer and the negative electrode layer may contain only the active material and solid electrolyte particles. That is, the positive electrode layer substantially contains only the above-described positive electrode active material, or substantially contains only the above-described positive electrode active material and a solid electrolyte material. And, the negative electrode layer substantially contains only the above-described negative electrode active material, or substantially contains only the above-described negative electrode active material and a solid electrolyte material. The term "contain" or "substantially contain" as used herein means that auxiliary components (electrode auxiliary components in a solid-state battery) such as a conductive auxiliary agent and/or a sintering aid may be contained as necessary (e.g., each of the conductive auxiliary agent and/or the sintering aid may be contained in an amount of 30% by volume or less, preferably 15% by volume or less, based on the total amount of the electrode layer), and further means that the presence of an extremely small amount of component that may be inevitably or accidentally mixed during formation of the electrode layer is acceptable (e.g., it is acceptable that such inevitable or accidental components are contained in an amount of 5% by weight or less, preferably 2% by weight or less, more preferably 1% by weight or less, based on the total amount of the electrode layer). In short, the solid-state battery active material and the solid-state battery electrolyte are main components so that the solid-state battery functions as a battery although the current collector/current collecting layer is not included in each of the electrode layers of the positive electrode layer and the negative electrode layer (e.g., in each electrode layer, the volume of the electrode main component is a value that exceeds at least half of the total volume of each electrode layer, preferably a value that exceeds ¾ of the total volume).

More specifically, among the plurality of electrode layers, the outermost electrode layer serving as the outermost layer of the solid-state battery laminate has a different active material amount with respect to the non-outermost electrode layer located on the inner side of the outermost layer. That is, in the collection-less solid-state battery, the active material amount in the electrode layer located on the outermost side and the active material amount in the electrode layer located on the inner side from the outermost layer are different from each other. The "active material amount" as used herein substantially means the mass of the positive electrode active material or the negative electrode active material contained in each electrode layer.

Since the active material amounts in the outermost electrode layer and the non-outermost electrode layer are different from each other as described above, a collection-less solid-state battery more desirable in terms of charge/discharge reaction is provided. In particular, the balance of the depth of charge and discharge is improved between the outermost electrode layer and the non-outermost electrode layer. Therefore, a prescribed voltage can be easily obtained at the time of discharge, and discharge can be performed at a target energy density. In other words, battery deterioration is suppressed from a long-term viewpoint due to such a desired discharge, and as a result, a solid-state battery with improved long-term reliability can be provided.

The term "outermost electrode layer" as used herein, in a broad sense, refers to an electrode layer located on the outermost side among electrode layers laminated in the solid-state battery laminate, and in a narrow sense, refers to an electrode layer (positive electrode layer and/or negative electrode layer) located on the outermost side as viewed in the lamination direction among a plurality of electrode layers (positive electrode layer and/or negative electrode layer) constituting a battery constituent unit of the solid-state battery laminate.

On the other hand, the term "non-outermost electrode layer" as used herein, in a broad sense, refers to an electrode layer located on the inner side of the electrode layer located on the outermost side among electrode layers laminated in the solid-state battery laminate, and in a narrow sense, refers to an electrode layer (positive electrode layer and/or negative electrode layer) located on the inner side in the lamination direction with respect to an electrode layer (positive electrode layer and/or negative electrode layer) located on the outermost side as viewed in the lamination direction among a plurality of electrode layers (positive electrode layer and/or negative electrode layer) constituting a battery constituent unit of the solid-state battery laminate.

When a plurality of non-outermost electrode layers exists, an electrode layer that exists on the inner side (the inner side along the lamination direction of the solid-state battery laminate) of an outermost electrode layer of interest and has the same polarity (identical polarity) as the outermost electrode layer may be regarded as a "non-outermost electrode layer" in the present invention. More specifically, the non-outermost electrode layer may be an inner layer electrode having the same polarity as that of an outermost electrode layer of interest and existing closest to the outermost electrode layer. When a plurality of non-outermost electrode layers exists in the solid-state battery laminate, various physical quantities such as "mass and thickness of the non-outermost electrode layer" to be described later may be considered as an average (e.g., arithmetic mean) in the plurality of non-outermost electrode layers.

In the solid-state battery of the present invention, among the plurality of electrode layers, the outermost electrode layer serving as the outermost layer of the solid-state battery laminate has a different active material amount with respect to the non-outermost electrode layer located on the inner side of the outermost layer. Preferably, the active material amount in the outermost electrode layer is half the active material amount in the non-outermost electrode layer. That is, the active material amount in the electrode layer located on the outermost side among the electrode layers laminated in the solid-state battery laminate is half the active material amount in the non-outermost electrode layer (i.e., the inner layer electrode) located on the inner side of the outermost electrode layer.

For example, while the plurality of non-outermost electrode layers serving as laminated elements of the solid-state battery laminate has the same active material amount, the outermost electrode layer of the laminated element of the solid-state battery laminate has half of the active material amount.

Without being bound by a specific theory, when the amount of the active material of the outermost electrode layer is half the amount of the active material of the non-outermost electrode layer, the depth of charge and discharge easily coincides between the outermost electrode layer and the non-outermost electrode layer, and a prescribed voltage (discharge voltage) can be obtained at the time of discharging the solid-state battery. This means that the solid-state battery of the present invention can be discharged at substantially a target energy density. In addition, if a prescribed voltage can be obtained as described above, the influence on the operation of other elements is reduced when the solid-state battery is mounted on a circuit board. The term "depth of charge and discharge" as used herein means a combination of the depth of charge and the depth of discharge. The "depth of charge" means the ratio of the amount of charge to the rated capacity, and the "depth of discharge" means the ratio of the amount of discharge to the rated capacity.

The term "half" as used herein does not necessarily have to be perfect, and means that it may be a mode slightly shifted therefrom. For example, when the active material amount in the outermost electrode layer is $Q_A$ and the active material amount in the non-outermost electrode layer is $Q_B$, $Q_A=0.5 \times Q_B$ is most preferable, but $Q_A$ may be in the range of $Q_A=0.4 \times Q_B$ to $0.6 \times Q_B$, for example, $Q_A=0.45 \times Q_B$ to $0.55 \times Q_B$, or $Q_A=0.48 \times Q_B$ to $0.52 \times Q_B$.

The present invention is not necessarily limited to the viewpoint of mass, and the outermost electrode layer and the non-outermost electrode layer may have such a relationship in terms of volume. Therefore, in one aspect, it is also conceivable that the volume of the electrode layer (i.e., the outermost electrode layer) located on the outermost side among the electrode layers constituting the solid-state battery laminate is half the volume of the non-outermost electrode layer (i.e., the non-outermost electrode layer) located on the inner side of the outermost electrode layer.

In a preferred aspect, the thickness of the outermost electrode layer is half the thickness of the non-outermost electrode layer. For example, as shown in FIG. 1, the thickness of an outermost electrode layer 10A located on the outermost side among a plurality of electrode layers 10 laminated in a solid-state battery laminate 100' is half the thickness of a non-outermost electrode layer 10B (preferably, a non-outermost electrode layer 10B having the same polarity as the outermost electrode layer 10A) located on the inner side of the outermost electrode layer 10A. Such a thickness allows the depth of charge and discharge to easily coincide between the outermost electrode layer and the non-outermost electrode layer, which allows a prescribed voltage (discharge voltage) to be easily obtained at the time of discharging the solid-state battery.

More specifically, particularly when the outermost electrode layer 10A having a substantially constant thickness has a thickness that is half the thickness of the non-outermost electrode layer 10B similarly having a substantially constant thickness, the active material amount of the outermost electrode layer is likely to be half the active material amount of the non-outermost electrode layer, and therefore the depth of charge and discharge are likely to coincide between the outermost electrode layer and the non-outermost electrode layer (in particular, the term "non-outermost electrode layer" as used herein refers to, for example, a non-outermost electrode layer having the same polarity as that of the outermost electrode layer existing on the inner side of the outermost electrode layer of interest). As a result, a prescribed discharge voltage is easily obtained at the time of discharging the solid-state battery. This is particularly true when the outermost electrode layer and the non-outermost electrode layer have the same or substantially the same active material density. The term "thickness" as used in this aspect substantially means a thickness dimension at an intermediate point in the width direction of the electrode ("lateral direction" in the drawing) in the sectional view of the solid-state battery laminate.

For example, while the plurality of non-outermost electrode layers serving as laminated elements of the solid-state battery laminate has the same thickness, the outermost electrode layer of the laminated element of the solid-state battery laminate has half of the thickness of the non-outermost electrode layer. As a more specific aspect, when the outermost electrode layer is a positive electrode layer, the thickness of the outermost positive electrode layer (electrode mixture film thickness of the positive electrode located on the outermost side) may be half the thickness of the positive electrode layer serving as a non-outermost electrode layer (electrode mixture film thickness of the positive electrode located on the inner layer), and may be half the thicknesses of all positive electrode layers serving as such a non-outermost electrode layer. Similarly, when the outermost electrode layer is a negative electrode layer, the thickness of the outermost negative electrode layer (electrode mixture film thickness of the negative electrode located on the outermost side) may be half the thickness of the negative electrode layer serving as a non-outermost electrode layer (electrode mixture film thickness of the negative electrode located on the inner layer), and may be half the thicknesses of all negative electrode layers serving as such a non-outermost electrode layer. Even in such an aspect, the depth of charge and discharge can be balanced between the outermost electrode layer and the non-outermost electrode layer, so that a prescribed voltage can be easily obtained at the time of discharge, and discharge can be performed at a target energy density.

The term "half" as used herein also does not necessarily have to be perfect, and means that it may be a mode slightly shifted therefrom. For example, when the thickness of the outermost electrode layer is $T_A$ and the thickness of the non-outermost electrode layer is $T_B$, $T_A=0.5 \times T_B$ is most preferable, but $T_A$ may be in the range of $T_A=0.4\times T_B$ to $0.6\times T_B$, for example, $T_A=0.45\times T_B$ to $0.55\times T_B$, or $T_A=0.48\times T_B$ to $0.52\times T_B$.

In another preferred aspect, the outermost electrode layer has a non-active material region where no active material exists so as to form a penetrating portion in a plan view thereof. That is, in such an aspect, the outermost electrode layer is provided with a region that penetrates as if there is a hole in the outermost electrode layer and in which no non-active material exists. In other words, in the outermost electrode layer, the active material does not uniformly exist in substantially the entire region, and a portion having no active material (a portion having no active material in a macroscopic view) may exist in a part thereof. The active material amount in the outermost electrode layer can be easily adjusted by the non-active material region, and the active material amounts in the outermost electrode layer and the non-outermost electrode layer can be more easily made different from each other. Preferably, through such a non-active material region, the active material amount in the outermost electrode layer is half the active material amount in the non-outermost electrode layer.

As can be seen from the above description, the "non-active material region where no active material exists so as to form a penetrating portion in a plan view" as used herein refers to a portion where the active material does not substantially exist as if the electrode layer has a hole and penetrates the layer when viewed from a plan view of the electrode layer of interest, that is, a portion where the active material does not exist so as to form a solid electrode layer except in an exceptional case where the active material undesirably or accidentally remains.

Although it is merely an example, the plan view area of the outermost electrode layer may be half the plan view area of the non-outermost electrode layer. That is, while the non-active material region leads to a reduction in the plan view area of the outermost electrode layer, the reduced plan view area of the outermost electrode layer may be half the plan view area of the non-outermost electrode layer. As described above, the "non-outermost electrode layer" preferably exists on the inner side (the inner side along the lamination direction of the solid-state battery laminate) of the outermost electrode layer of interest, and can correspond to an electrode layer having the same polarity (identical polarity) as the outermost electrode layer. Therefore, the outermost electrode layer and the non-outermost electrode layer may preferably have the same or substantially the same thickness and/or active material density and the like, but in the relationship of the plan view area as described above, the active material amount of the outermost electrode layer is likely to be half the active material amount of the non-outermost electrode layer.

When the non-active material region exists, the outermost electrode layer may have a hollow portion. In this regard, the outermost electrode layer may locally or sectionally have a non-active material region in the solid-state battery laminate. The non-active material region corresponds to a region where the active material is not provided in a part (a single part or a plurality of the parts) of the outermost electrode layer of interest. In a preferred aspect, the outermost electrode layer has a plurality of local non-active material regions in the solid-state battery laminate. Even when the active material amount is made different between the outermost electrode layer and the non-outermost electrode layer depending on the plurality of local non-active material regions, the depth of charge and discharge can be balanced between the outermost electrode layer and the non-outermost electrode layer, and a prescribed voltage can be easily obtained at the time of discharge. The outermost electrode layer may include a local hollow portion provided due to the non-active material region in the solid-state battery laminate. The single or plurality of non-active material regions is portion(s) where no active material exists (portions having no active material in a macroscopic view), and the portions may be provided as hollow portions of the solid-state battery laminate.

Since the hollow portion is a non-active material region, the hollow portion contributes to adjustment of the active material amount in the outermost electrode layer, and preferably can also exhibit a stress reduction effect. Specifically, in charging and discharging of the solid-state battery, a stress causing crack generation may be generated in the solid-state battery laminate due to expansion and contraction of the electrode layer, but such undesirable stress can be reduced by the existence of the hollow portion.

In the case of the non-active material region, the non-active material region may be provided as a non-hollow portion. For example, an aspect in which the solid electrolyte portion is included in the non-active material region may be adopted. In such a case, it is not necessary that the entire non-active material region is filled with the solid electrolyte, and an aspect in which the hollow portion is left in part may be adopted. In other words, an aspect in which the solid electrolyte exists in at least a part of the non-active material region of the outermost electrode layer may be adopted.

Since the non-active material region does not contain any active material, the non-active material region contributes to the adjustment of the active material amount in the outermost electrode layer, and when the solid electrolyte is provided in the region, a contact area between a solid electrolyte layer portion and the outermost electrode layer increases. As the contact area increases, a reaction area also increases, so that an effect of reducing the element resistance can also be obtained.

The solid-state battery according to the present invention is a laminated solid-state battery formed by laminating layers constituting a battery constituent unit, and can be manufactured by a printing method such as a screen printing method, a green sheet method using a green sheet, or a combination method thereof. Therefore, each layer constituting the battery constituent unit is composed of a sintered body. Preferably, the positive electrode layer, the negative electrode layer, and the solid electrolyte are sintered integrally with each other. That is, it may be said that the solid-state battery laminate forms a fired integrated product. In such a fired integrated product, the active material amount in the outermost electrode layer is different from that in the non-outermost electrode.

For example, taking the aspect shown in FIG. 1 as an example, the outermost electrode layer 10A corresponds to an uppermost electrode layer 10A1 and a lowermost electrode layer 10A2 in the solid-state battery laminate 100'. In the present invention, the active material amount in each of the uppermost electrode layer and the lowermost electrode layer may be different from that in the electrode layer on the inner side thereof, or the active material amount in either one of the uppermost electrode layer and the lowermost electrode layer may be different from that in the electrode layer on the inner side thereof. When it is more emphasized that a prescribed voltage is easily obtained at the time of discharging the solid-state battery, the active material amounts in both the uppermost electrode layer and the lowermost electrode layer are preferably different from those in the electrode layers on the inner sides of the uppermost electrode layer and the lowermost electrode layer.

More specifically, the outermost electrode layer may correspond to an outermost positive electrode layer or an outermost negative electrode layer. When the outermost electrode layer provided as the uppermost electrode layer or the lowermost electrode layer is the outermost positive electrode layer, the outermost positive electrode layer preferably has a different active material amount with respect to the non-outermost positive electrode layer located on the inner side from the outermost positive electrode layer, and for example, the outermost positive electrode layer more preferably has half of the active material amount or thickness of the non-outermost positive electrode layer. Similarly, when the outermost electrode layer provided as the uppermost electrode layer or the lowermost electrode layer is the outermost negative electrode layer, the outermost negative electrode layer preferably has a different active material amount with respect to the non-outermost negative electrode layer located on the inner side from the outermost negative electrode layer, and for example, the outermost negative electrode layer more preferably has half of the active material amount or thickness of the non-outermost negative electrode layer. In the exemplary aspect shown in FIG. 2, the thickness of an outermost positive electrode layer 12A as the outermost electrode layer is half the thickness of a non-outermost positive electrode layer 12B on the inner side thereof. As can be seen from the above description, the non-outermost electrode layer to be compared with the outermost electrode layer in the present invention preferably has an identical polarity to (in a preferred aspect, particularly the same electrode material, in other words, the same active material density as) that of the outermost electrode layer. When a plurality of electrodes having the same polarity exists as the non-outermost electrode layer, an average (particularly, arithmetic mean) thereof is used.

A more realistic aspect of the solid-state battery will be described. The solid-state battery may further include a protective layer and/or a terminal (external terminal). Although it is merely an example, a parallel laminated all-solid-state battery shown in FIG. 3 may include a positive electrode terminal 42 electrically connected to a positive electrode layer at one end of a solid-state battery laminate, and a negative electrode terminal 44 electrically connected to a negative electrode layer at the other end of the solid-state battery laminate. In addition, a protective layer 50 or the like may be provided outside the outermost electrode layer so as to be integrally laminated with the solid-state battery laminate. Although this may lead to an improvement in energy density per unit volume, the outermost electrode layer (in the aspect shown in FIG. 3, the outermost positive electrode layer 12A) may be flush with the solid electrolyte portion of the solid-state battery laminate.

A plurality of non-outermost positive electrode layers in the solid-state battery laminate all may have the same or similar form (e.g., a form such as a thickness dimension). In a preferred aspect, all of the plurality of non-outermost positive electrode layers having the same polarity as each other have the same or similar form.

The present invention can be embodied in various aspects. This will be described below.

(Outermost Electrode Layer Having Patterned Layer)

This aspect is an aspect in which the outermost electrode layer is a patterned layer. More specifically, as shown in FIGS. 4A to 4D, FIGS. 5A to 5D, and FIGS. 6A to 6B, the outermost electrode layer 10A has a pattern shape in a plan view due to the non-active material region.

As can be seen from the illustrated form, in the plan view of the outermost electrode layer 10A, an entire shape formed by an active material existing region $10A_a$ or an active material non-existing region $10A_b$ is a "pattern shape". Since having such a pattern shape, the outermost electrode layer is a patterned layer.

The term "patterned layer" as used herein in a broad sense means that a plan view shape of an electrode layer of interest has a predetermined shape and in a narrow sense means that the plan view shape has a regular shape or a geometric shape.

Since the patterned layer includes a non-active material region, it is possible to preferably reduce stress while adjusting the active material amount in the outermost electrode layer. That is, it is also possible to reduce undesirable stress such as stress of crack generation that may occur in the solid-state battery laminate during charging and discharging with the patterned layer. In addition, since the patterned layer preferably has a certain regular shape or geometric shape, the charge and discharge reaction of the solid-state battery becomes more uniform, and an effect of suppressing cycle deterioration in charge and discharge can also be exhibited. Furthermore, for example, the regular shape may have a shorter distance over which lithium ions conduct in the solid electrolyte layer, and therefore, improvement of rate characteristics is expected.

In terms of reducing the stress and/or making the charge-discharge reaction between the positive electrode and the negative electrode more uniform, the outermost electrode layer preferably has a symmetrical plan view shape. For example, the plan view shape of the outermost electrode layer may be line-symmetric and/or point-symmetric. More specifically, the shape formed by the active material existing region $10A_a$ or the active material non-existing region $10A_b$ of the outermost electrode layer in the plan view may be line-symmetric or point-symmetric.

In the illustrated exemplary aspect, the outermost electrode layer 10A having a line-symmetric plan view shape may be, for example, as shown in FIGS. 4A to 4C and FIGS. 5A to 5D. Similarly, the outermost electrode layer 10A having a point-symmetric plan view shape may be, for example, as shown in FIGS. 4A to 4B and FIGS. 5A, 5B, and 5D. As can be seen from the above description, in one preferred aspect, the plan view shape of the outermost electrode layer has both line symmetry and point symmetry.

In the case of an outermost electrode layer having such a "patterned layer", as can be seen from the illustrated form, the active material existing region $10A_a$ preferably has a form in which a part thereof reaches the peripheral edge of the layer. This is because the electrode can be suitably taken out from the end of the solid-state battery laminate. That is, in the plan view shape of the outermost electrode layer shown in FIGS. 4A to 4D, FIGS. 5A to 5D, and FIGS. 6A to 6B, the active material existing region $10A_a$ is preferably formed in contact with the side forming the shape.

(Outermost Electrode Layer Having Porous Structure)

Figure 7:
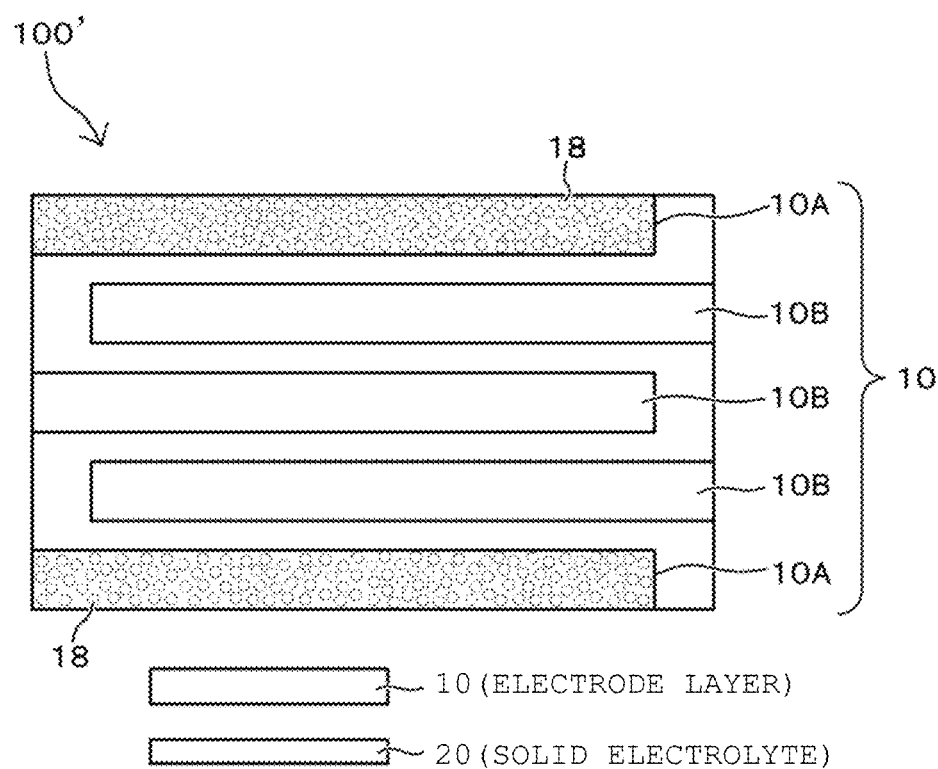
FIG. 7 is a schematic sectional view of a solid-state battery laminate having an aspect in which an outermost electrode layer has a porous structure.

This aspect is an aspect in which the outermost electrode layer has a porous structure. More specifically, as shown in FIG. 7, the outermost electrode layer 10A is a layer having minute voids 18 such as a porous layer. When the outermost electrode layer has a porous structure, the active material density is reduced due to minute voids, so that the active material amount in the outermost electrode layer can be adjusted. Such a porous structure also contributes to stress reduction. That is, in the outermost electrode layer having the porous structure, not only the active material amount in the outermost electrode layer can be adjusted, but also undesirable stress such as stress of crack generation that may occur in the solid-state battery laminate during charging and discharging can be reduced.

(Outermost Electrode Layer Having Non-Constant Thickness)

Figure 8:
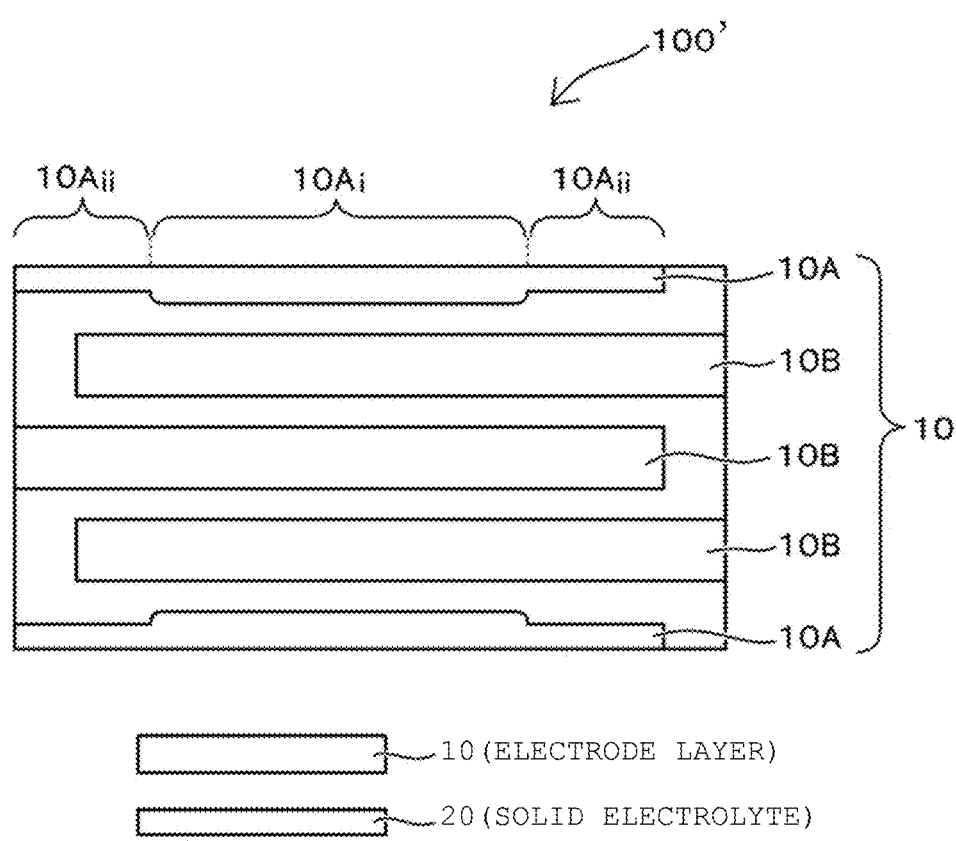
FIG. 8 is a schematic sectional view of a solid-state battery laminate having an aspect in which the thickness of each outermost electrode layer is non-constant (an aspect having a relatively thick portion and a relatively thin portion).
Figure 9:
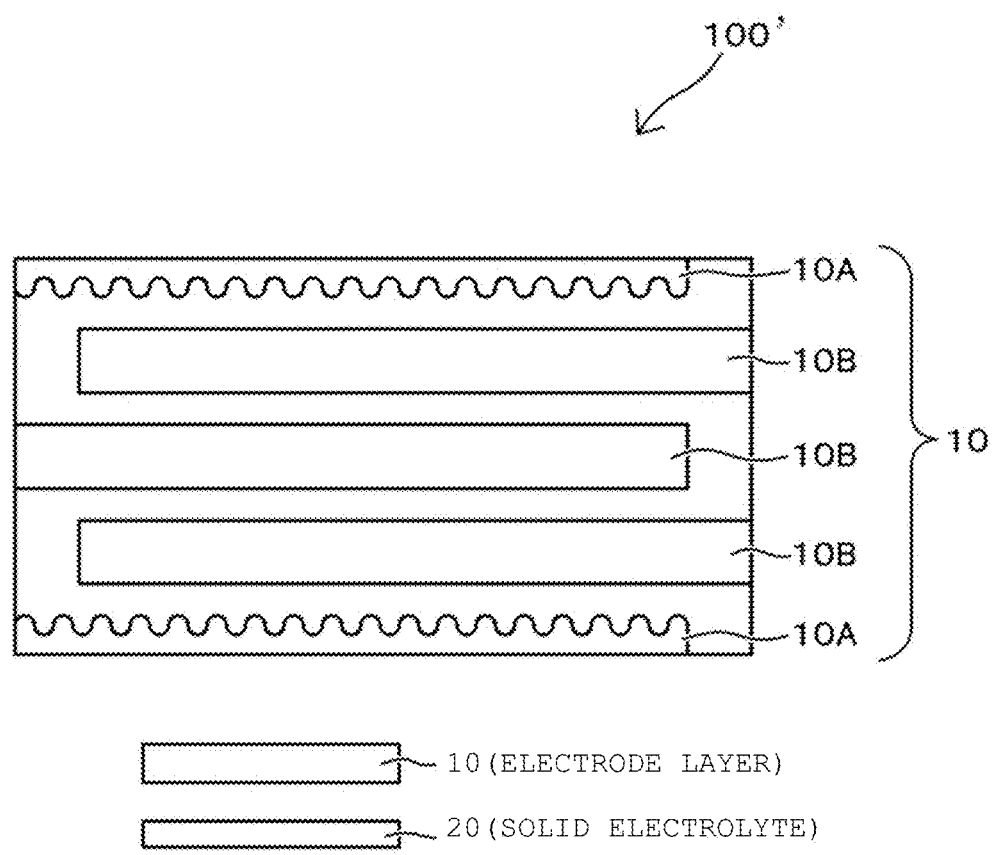
FIG. 9 is a schematic sectional view of a solid-state battery laminate having an aspect in which the thickness of each outermost electrode layer is non-constant (an aspect in which the thickness dimension periodically varies).

This aspect is an aspect in which the thickness of the outermost electrode layer is not constant. Specifically, as shown in FIGS. 8 and 9, the thickness of a certain outermost electrode layer 10A is not constant among the outermost electrode layers, and is locally changed. The active material amount in the outermost electrode layer can be adjusted by locally changing the thickness of each outermost electrode layer. Therefore, by the "non-constant thickness", the active material amounts in the outermost electrode layer and the non-outermost electrode layer can be made different from each other, and preferably, the active material amount in the outermost electrode layer can be reduced to a half of the active material amount in the non-outermost electrode layer.

The aspect shown in FIG. 8 has a relatively thick portion $10A_i$ and a relatively thin portion $10A_{ii}$. The active material amount in the outermost electrode layer can be appropriately adjusted by adjusting the ratio of the relatively thick portion $10A_i$ or the relatively thin portion $10A_{ii}$ in the outermost electrode layer. Further, in the aspect shown in FIG. 9, the thickness dimension of the outermost electrode layer periodically (or regularly) varies in the sectional view. Similarly, by changing the pitch and amplitude in the thickness variation period, the active material amount in the outermost electrode layer can be appropriately adjusted. In addition, in such an aspect, since the contact area between the outermost electrode layer and the solid electrolyte layer is increased, a charge-discharge reaction area is also increased, and reduction in element resistance can be expected.

(Same Thicknesses Between Outermost Electrode Layer and Non-Outermost Electrode Layer)

In this aspect, the outermost electrode layer and the non-outermost electrode layer have the same thickness. This is particularly true, for example, when the outermost electrode layer has a non-active material region. That is, when the plan view area of the outermost electrode layer is half the plan view area of the non-outermost electrode layer, or when the outermost electrode layer is a patterned layer, the thicknesses of the outermost electrode layer and the non-outermost electrode layer may be the same. This means that while the outermost electrode layer and the non-outermost electrode layer have different forms in the plan view, the thickness of a solid portion of the electrode layer may be the same between the outermost electrode layer and the non-outermost electrode layer in sectional view. Even though the thickness of the electrode layer (particularly, the thickness of the solid portion of the electrode) is the same therebetween, the non-active material region exists in the outermost electrode layer, and therefore, the active material amounts in the outermost electrode layer and the non-outermost electrode layer may be different from each other.

The term "Identical" as used herein also does not necessarily have to be perfect, and means that it may be a mode slightly shifted therefrom. For example, when the thickness of the solid portion of the outermost electrode layer is $t_A$ and the thickness of the solid non-outermost electrode layer is $t_B$, $t_A=t_B$ is most preferable, but $t_A$ may be in the range of $t_A=0.9 \times t_B$ to $1.1 \times t_B$, for example, $t_A=0.95 \times t_B$ to $1.05 \times t_B$, or $t_A=0.98 \times t_B$ to $1.02 \times t_B$.

[Method for Manufacturing Solid-State Battery]

As described above, the solid-state battery of the present invention can be manufactured by a printing method such as a screen printing method, a green sheet method using a green sheet, or a combination method thereof. Hereinafter, a case of adopting a printing method for the purpose of understanding the present invention will be described in detail, but the present invention is not limited to this method.

The method for manufacturing the solid-state battery of the present invention includes steps of forming an unfired laminate by a printing method; and firing the unfired laminate.

(Step of Forming Unfired Laminate)

In this step, several types of pastes such as a positive electrode layer paste, a negative electrode layer paste, a solid electrolyte paste, and a protective layer paste may be used as an ink. That is, an unfired laminate having a predetermined structure can be formed on a supporting substrate by applying the paste by a printing method.

The paste can be prepared by wet-mixing a predetermined constituent material of each layer appropriately selected from the group consisting of a positive electrode active material, a negative electrode active material, an electron conductive material (e.g., an electron conductive material serving as a conductive auxiliary agent), a solid electrolyte material, an insulating material, and a sintering aid with an organic vehicle in which an organic material is dissolved in a solvent. The positive electrode layer paste contains, for example, a positive electrode active material, an electron conductive material, a solid electrolyte material, an organic material, and a solvent. The negative electrode layer paste contains, for example, a negative electrode active material, an electron conductive material, a solid electrolyte material, an organic material, and a solvent. The solid electrolyte layer paste contains, for example, a solid electrolyte material, a sintering aid, an organic material, and a solvent. The protective layer paste contains, for example, an insulating substance, an organic material, and a solvent.

The organic material contained in the paste is not particularly limited, and at least one polymer material selected from the group consisting of a polyvinyl acetal resin, a cellulose resin, a polyacrylic resin, a polyurethane resin, a polyvinyl acetate resin, a polyvinyl alcohol resin, and the like can be used. The solvent is not particularly limited as long as the above organic material can be dissolved, and for example, toluene and/or ethanol can be used.

In the wet mixing, a medium can be used, and specifically, a ball mill method, a visco mill method, or the like can be used. On the other hand, a wet mixing method without using a medium may be used, and a sand mill method, a high-pressure homogenizer method, a kneader dispersion method, or the like can be used.

The supporting substrate is not particularly limited as long as it can support the unfired laminate, and for example, a substrate made of a polymer material such as polyethylene terephthalate can be used. When the unfired laminate is subjected to the firing step while being held on the substrate, a substrate having heat resistance to a firing temperature may be used.

At the time of printing, an unfired laminate corresponding to the structure of a predetermined solid-state battery can be formed on the substrate by sequentially laminating printed layers with predetermined thickness and pattern shape. When each printed layer is formed, a drying treatment is performed. In the drying treatment, the solvent is evaporated from the unfired laminate. After the unfired laminate is formed, the unfired laminate may be peeled off from the substrate and subjected to the firing step, or the unfired laminate may be subjected to the firing step while being held on the supporting substrate.

In the above description, the method of forming all the layers into a paste and performing printing has been described, but the present invention is not necessarily limited thereto. For example, a layer constituting an unfired laminate may be formed by molding a slurry raw material into a sheet shape. In this regard, as an example, a slurry of a solid electrolyte may be formed into a sheet and a paste for a positive electrode or a negative electrode may be screen-printed on the sheet of the solid electrolyte, and an unfired laminate may be obtained through such a method.

(Firing Step)

In the firing step, the unfired laminate is subjected to firing. Although these are merely examples, the firing may be performed by removing the organic material in a nitrogen gas atmosphere containing oxygen gas or in the atmosphere, for example, at 500° C., and then heating the unfired laminate in a nitrogen gas atmosphere or in the atmosphere, for example, at 550° C. to 1000° C. The firing may be performed while pressurizing the unfired laminate in the lamination direction (in some cases, the lamination direction and a direction perpendicular to the lamination direction).

Through such firing, a solid-state battery laminate is formed from the unfired laminate, and a desired solid-state battery is finally obtained.

(Preparation of Characteristic Portion in the Present Invention)

In the solid-state battery of the present invention, the active material amounts in the outermost electrode layer and the non-outermost electrode layer are different from each other, but the unfired laminate may be prepared in advance so that their active material amounts are different from each other. For example, the active material amounts in an outermost electrode layer precursor and a non-outermost electrode layer precursor of the unfired laminate may be made different from each other by adjusting the content of the active material to be charged into the raw material paste and/or the number of times of application.

For example, the active material amount in the outermost electrode layer may be set to half the active material amount in the non-outermost electrode layer by adjusting the content of the active material to be charged into the raw material paste and/or the number of times of application. That is, when the active material amount in the outermost electrode layer precursor is set to half the active material amount in the non-outermost electrode layer precursor in the unfired laminate, the active material amount in the outermost electrode layer can be reduced to a half of the active material amount in the non-outermost electrode layer in the solid-state battery laminate obtained after firing.

When the thickness of the outermost electrode layer is reduced to a half of the thickness of the non-outermost electrode layer, the thickness of the outermost electrode layer precursor of the unfired laminate is preferably reduced to a half of the thickness of the non-outermost electrode layer precursor, for example, by adjusting the application amount and/or the number of times of application of the raw material paste. When this unfired laminate is fired, a desired solid-state battery laminate in which the thickness of the outermost electrode layer is half the thickness of the non-outermost electrode layer can be obtained, and the active material amount in the outermost electrode layer can be reduced to a half of the active material amount in the non-outermost electrode layer (in particular, the case where the outermost electrode layer and the non-outermost electrode layer use the same active material and have the same or substantially the same active material density may be applied). Similarly, an outermost electrode layer and the like having a "non-constant thickness" can also be obtained by locally adjusting the paste of the outermost electrode layer precursor of the unfired laminate, the application method thereof, and the like.

When the outermost electrode layer is a patterned layer, for example, the outermost electrode layer precursor of the unfired laminate may be pattern-printed using screen printing or the like. When this outermost electrode layer precursor is fired, a desired solid-state battery laminate in which the outermost electrode layer is a patterned layer can be obtained. The outermost electrode layer including a "non-active material region" represented by a patterned layer or the like can be obtained by screen printing, but it can also be obtained by using a resin raw material paste that disappears after firing. For example, a paste including an organic vehicle not containing an active material may be used for forming the "non-active material region". In such a case, a portion to which the paste is applied may disappear during firing, so that a desired solid-state battery laminate including the non-active material region in the outermost electrode layer can be obtained. For example, by reducing the plan view area of the outermost electrode layer to a half of the plan view area of the non-outermost electrode layer due to the existence of such a non-active material region, the active material amount in the outermost electrode layer can be reduced to a half of the active material amount in the non-outermost electrode layer (in particular, the case where the outermost electrode layer and the non-outermost electrode layer use the same active material and have the same or substantially the same active material density and thickness may be applied). Similarly, an outermost electrode layer and the like having a "porous structure" can also be obtained by using a raw material paste containing a resin filler that can disappear during firing.

Although the embodiments of the present invention have been described above, only typical examples have been illustrated. Therefore, those skilled in the art will easily understand that the present invention is not limited thereto, and various embodiments are conceivable without changing the gist of the present invention.

Figure 2:
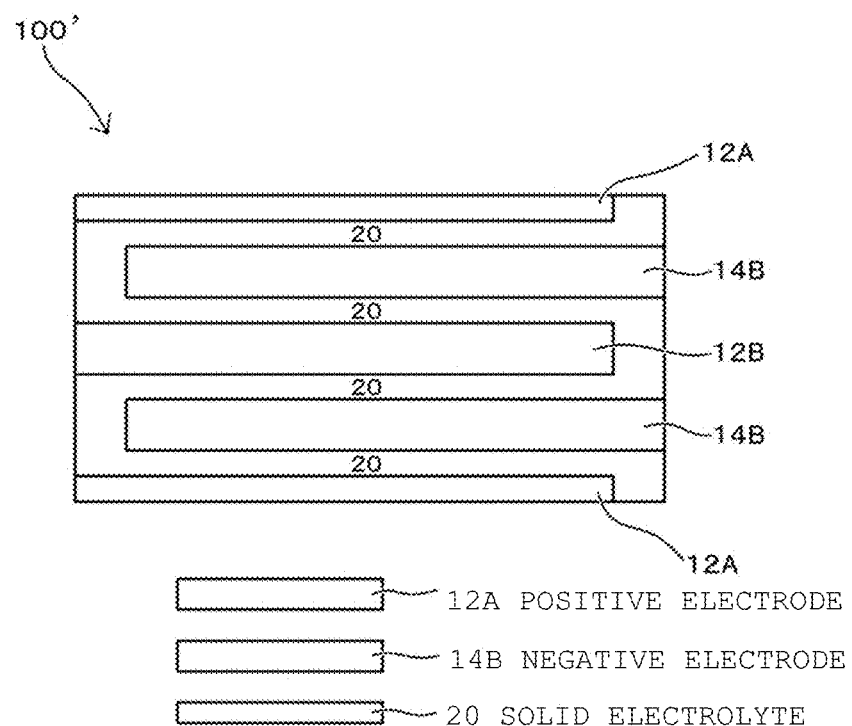
FIG. 2 is a sectional view schematically showing a solid-state battery (particularly, a solid-state battery laminate in which a positive electrode and a negative electrode are distinguished from each other) according to an embodiment of the present invention.
Figure 3:
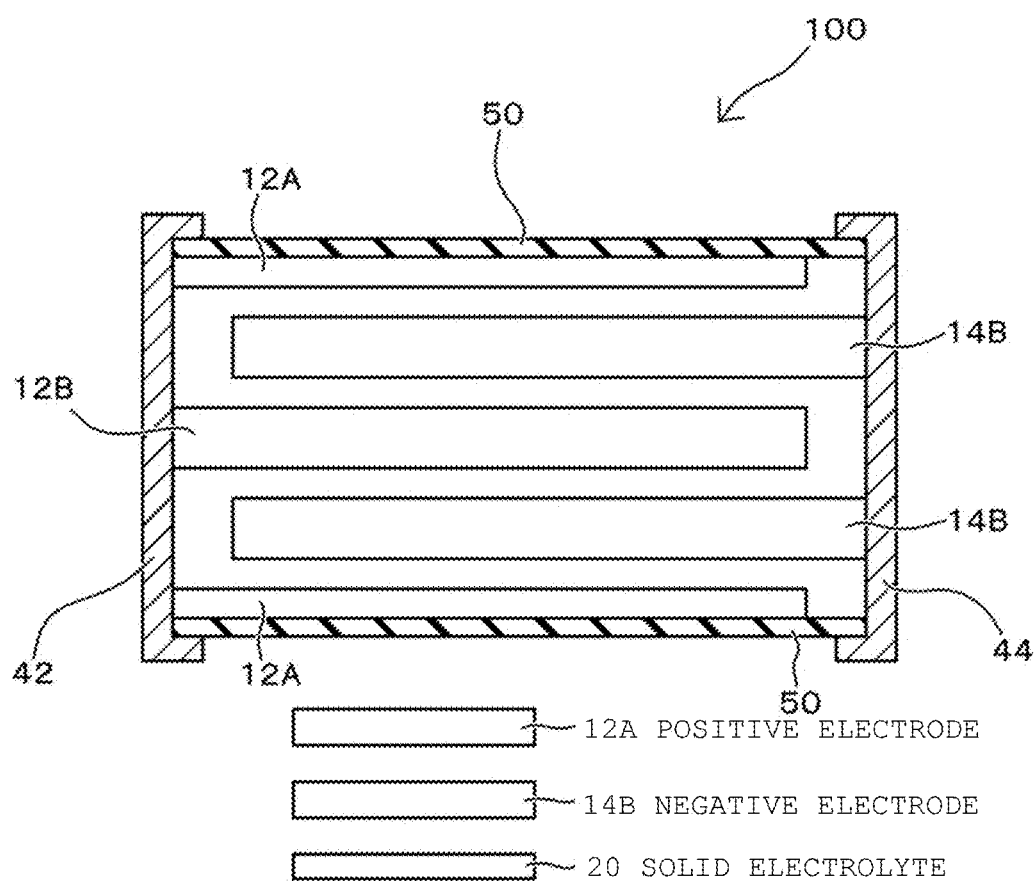
FIG. 3 is a sectional view schematically showing a solid-state battery according to an embodiment of the present invention.
Figure 4A:
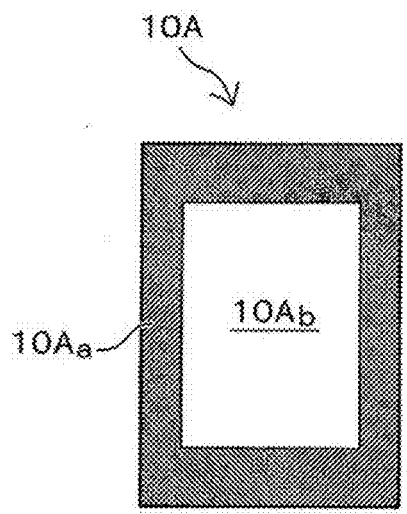
FIGS. 4A to 4D are schematic plan views of an outermost electrode layer provided as a patterned layer.
Figure 4B:
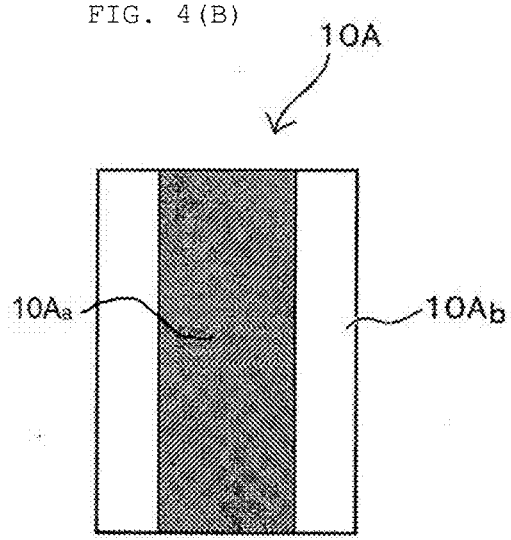
Figure 4C:
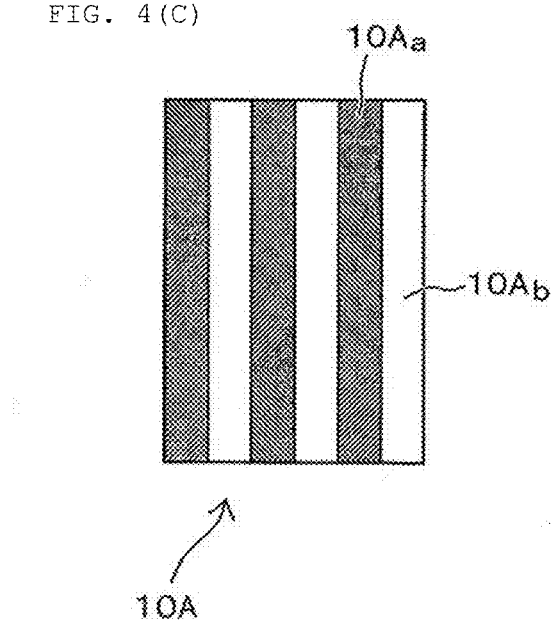
Figure 4D:
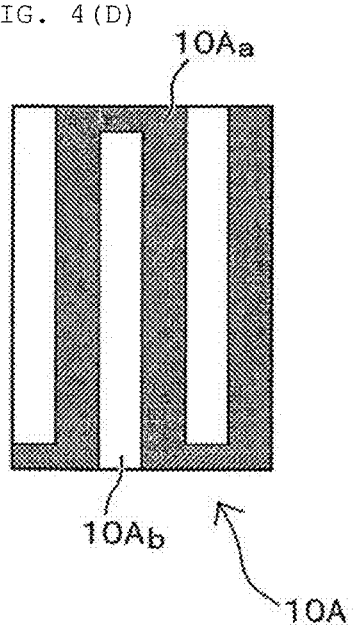
Figure 5A:
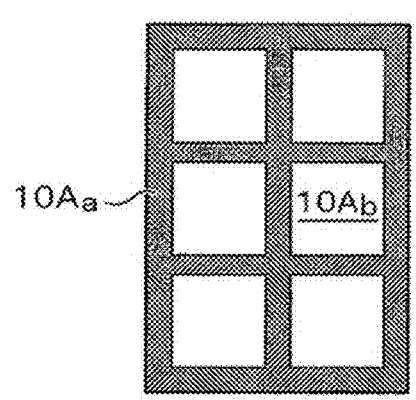
FIGS. 5A to 5D are schematic plan views of an outermost electrode layer provided as a patterned layer.
Figure 5B:
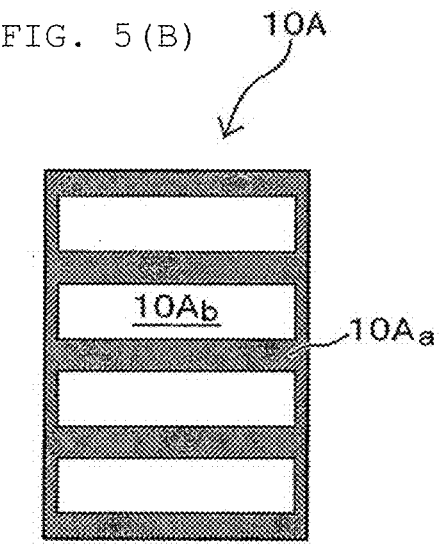
Figure 5C:
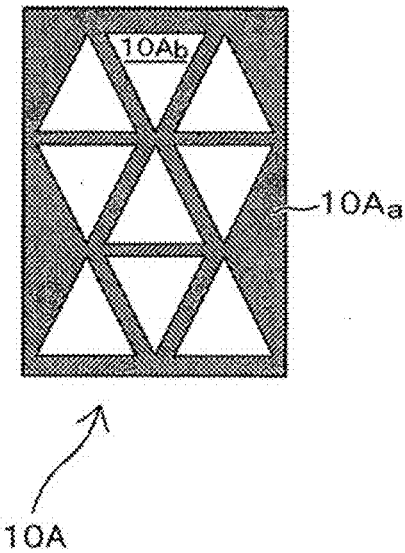
Figure 5D:
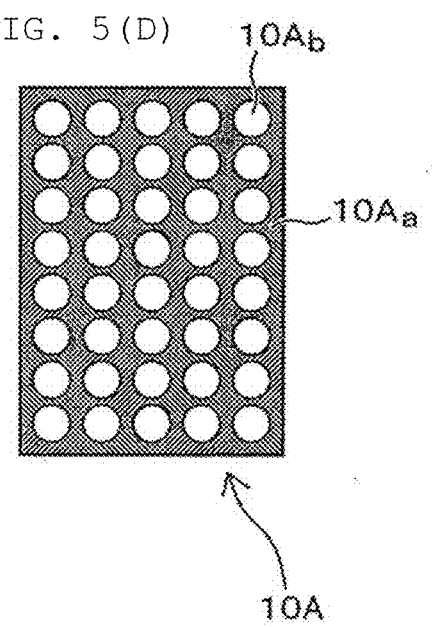
Figure 6A:
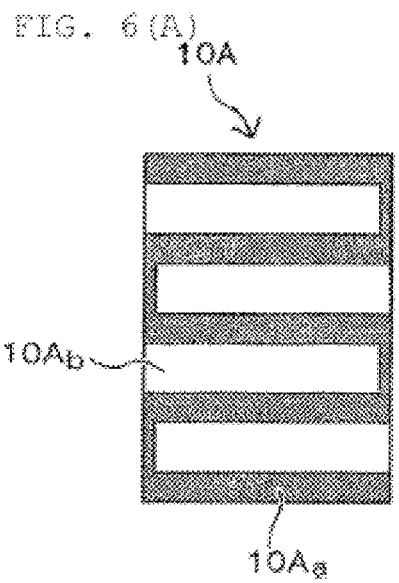
FIGS. 6A and 6B are schematic plan views of an outermost electrode layer provided as a patterned layer.
Figure 6B:
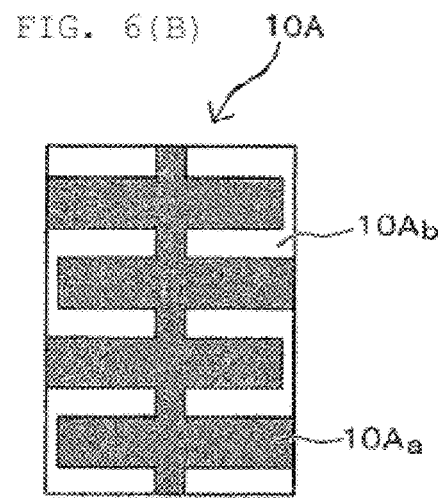

For example, in the above description, for example, the number of electrode layers (positive electrode layer and negative electrode layer) exemplified in FIGS. 2 and 3 has been mainly described, but the present invention is not necessarily limited thereto. In the present invention, any solid-state battery laminate provided with at least one non-outermost electrode layer (solid-state battery laminate of current collection-less battery) can be similarly applied.

In the above description, the "non-outermost electrode layer" has been mainly described as an electrode layer of the same polarity existing on the inner side of the target outermost electrode layer, but the present invention is not necessarily limited thereto. For example, when the positive electrode layer and the negative electrode layer have the same thickness, the electrode layer directly facing the target outermost electrode layer on the inner side can also be regarded as the "non-outermost electrode layer" in the present invention. Therefore, for example, in such a case, the thickness of the electrode layer directly facing the outermost electrode layer on the inner side of the outermost electrode layer may be half the thickness of the outermost electrode layer.

The solid-state battery of the present invention can be used in various fields where electric storage is assumed. Although these are merely examples, the solid-state battery of the present invention can be used in the fields of electricity, information, and communication in which electric and electronic equipment, and the like are used (e.g., electric and electronic equipment fields or mobile equipment fields including mobile phones, smartphones, notebook computers and digital cameras, activity meters, arm computers, electronic paper, RFID tags, card-type electronic money, small electronic machines such as smartwatches, etc.), home and small industrial applications (e.g., fields of electric tools, golf carts, and home, nursing, and industrial robots), large industrial applications (e.g., fields of forklifts, elevators, and harbor cranes), transportation system fields (e.g., fields of hybrid vehicles, electric vehicles, buses, trains, power-assisted bicycles, electric two-wheeled vehicles, etc.), power system applications (e.g., fields of various types of power generation, road conditioners, smart grids, household power storage systems, etc.), medical applications (medical equipment fields such as earphone hearing aids), pharmaceutical applications (fields of dosage management systems, etc.), IoT fields, space and deep sea applications (e.g., fields of a space probe, a submersible, etc.), and the like.

DESCRIPTION OF REFERENCE SYMBOLS

10: Electrode layer
10A: Outermost electrode layer
10A1: Uppermost electrode layer
10A2: Lowermost electrode layer
$10A_i$: Relatively thick portion of outermost electrode layer
$10A_{ii}$: Relatively thin portion of outermost electrode layer
10B: Non-outermost electrode layer
$10A_a$: Active material existing region of outermost electrode layer
$10A_b$: Active material non-existing region of outermost electrode layer
12A: Outermost positive electrode layer
12B: Non-outermost positive electrode layer
14B: Non-outermost negative electrode layer
20: Solid electrolyte portion
42: Terminal (positive electrode terminal)
44: Terminal (negative electrode terminal)
50: Protective layer
100': Solid-state battery laminate
100: Solid-state battery

The invention claimed is:

1. A solid-state battery comprising:
a solid-state battery laminate having a plurality of positive electrode layers, a plurality of negative electrode layers, and a plurality of solid electrolyte layers interposed between the plurality of positive electrode layers and the plurality of negative electrode layers,
wherein
each of electrode layers of the plurality of positive electrode layers and the plurality of negative electrode layers contains an active material,
an outermost electrode layer of the solid-state battery laminate among the electrode layers has a different active material amount with respect to a plurality of non-outermost electrode layers located on an inner side of the outermost electrode layer,
the solid-state battery laminate has a current collecting layer-less structure,
a solid electrolyte layer among the plurality of solid electrolyte layers is between the outermost electrode layer and the plurality of non-outermost electrode layers,
the outermost electrode layer and the plurality of non-outermost electrode layers have a same polarity and contain the same active material, and
wherein a total active material amount of all active materials in the outermost electrode layer is 40% to 60% of a total active material amount of all active materials in each of the plurality non-outermost electrode layers.

2. The solid-state battery according to claim 1, wherein each of the electrode layers of the plurality of positive electrode layers and the plurality of negative electrode layers comprises only the active material and solid electrolyte particles.

3. The solid-state battery according to claim 1, wherein the total active material amount in the outermost electrode layer is half of the total active material amount in the plurality of non-outermost electrode layers.

4. The solid-state battery according to claim 1, wherein a thickness of the outermost electrode layer is half a thickness of each of the plurality of non-outermost electrode layers.

5. The solid-state battery according to claim 4, wherein, (1) when the outermost electrode layer is a positive electrode layer, the thickness of the outermost electrode layer is half the thickness of each of all the positive electrode layers that are the plurality of non-outermost electrode layers, and (2) when the outermost electrode layer is a negative electrode layer, the thickness of the outermost electrode layer is half the thickness of each of all the negative electrode layers that are the plurality of non-outermost electrode layers.

6. The solid-state battery according to claim 1, wherein the plurality of outermost electrode layers have a non-active material region where no active material exists so as to form a penetrating portion in a plan view of the solid-state battery.

7. The solid-state battery according to claim 6, wherein a plan view area of the outermost electrode layer is half a plan view area of the plurality of non-outermost electrode layers.

8. The solid-state battery according to claim 6, wherein the outermost electrode layer is a patterned layer.

9. The solid-state battery according to claim 6, wherein the outermost electrode layer has a symmetrical plan view shape.

10. The solid-state battery according to claim 6, wherein the outermost electrode layer has a plurality of local non-active material regions in the solid-state battery laminate.

11. The solid-state battery according to claim 6, wherein the solid electrolyte exists in the non-active material region.

12. The solid-state battery according to claim 6, wherein the outermost electrode layer and the plurality of non-outermost electrode layers have a same thickness.

13. The solid-state battery according to claim 1, wherein the outermost electrode layer and the plurality of non-outermost electrode layers have a same thickness.

14. The solid-state battery according to claim 1, wherein the outermost electrode layer has a porous structure.

15. The solid-state battery according to claim 1, wherein a thickness of the outermost electrode layer is non-constant.

16. The solid-state battery according to claim 1, wherein the outermost electrode layer corresponds to an uppermost electrode layer and a lowermost electrode layer in the solid-state battery laminate.

17. The solid-state battery according to claim 1, wherein the solid-state battery laminate is a sintered body.

18. The solid-state battery according to claim 1, wherein the plurality of positive electrode layers and the plurality of negative electrode layers are layers capable of occluding and releasing a lithium ion.

* * * * *